(12) United States Patent
Totani et al.

(10) Patent No.: US 11,267,428 B2
(45) Date of Patent: Mar. 8, 2022

(54) AIRBAG COVER

(71) Applicant: TOYODA GOSEI CO., LTD., Kiyosu (JP)

(72) Inventors: Chiharu Totani, Kiyosu (JP); Toshihiko Kajiyama, Kiyosu (JP); Hajime Takai, Kiyosu (JP); Yuka Kobayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/151,272

(22) Filed: Jan. 18, 2021

(65) Prior Publication Data

US 2021/0229620 A1 Jul. 29, 2021

(30) Foreign Application Priority Data

Jan. 23, 2020 (JP) .............................. JP2020-009317

(51) Int. Cl.
| | |
|---|---|
| *B60R 21/2165* | (2011.01) |
| *B60R 21/205* | (2011.01) |
| *B29L 31/30* | (2006.01) |
| *B29C 59/00* | (2006.01) |

(52) U.S. Cl.
CPC ........ *B60R 21/2165* (2013.01); *B60R 21/205* (2013.01); *B29C 59/007* (2013.01); *B29L 2031/3008* (2013.01); *B29L 2031/3038* (2013.01)

(58) Field of Classification Search
None
See application file for complete search history.

(56) References Cited

U.S. PATENT DOCUMENTS

| | | | |
|---|---|---|---|
| 9,352,717 B2 * | 5/2016 | Tomaj | B32B 7/14 |
| 2012/0217729 A1 | 8/2012 | Horibe et al. | |
| 2021/0155193 A1 * | 5/2021 | Moriizumi | B60R 21/205 |

FOREIGN PATENT DOCUMENTS

| | | |
|---|---|---|
| JP | 2009-248907 A | 10/2009 |
| JP | 2012-176663 A | 9/2012 |
| WO | WO-2019081379 A1 * | 5/2019 ......... B60R 21/2165 |

* cited by examiner

*Primary Examiner* — Faye M Fleming
(74) *Attorney, Agent, or Firm* — Posz Law Group, PLC (57) ABSTRACT

An airbag cover includes a substrate and a skin adhered to the substrate. The substrate includes an H-shaped tear seam and doors that are disposed on both sides of a crossbar portion of the tear seam and openable for forming an emergence opening when the tear seam tears. The skin includes a breakable region that is formed into a straight line and breakable to form the emergence opening. The breakable region includes a central portion disposed immediately above the crossbar portion, and two extended portions which extend from opposite ends of the central portion to outside of the vertical portions. The skin further includes, in each of the extended portions of the breakable region, an unadhered region where the skin is not adhered to the substrate. Each of the unadhered regions has a band shape whose width is smaller than a length of the vertical-bar portion of the tear seam.

4 Claims, 8 Drawing Sheets

AIRBAG COVER

CROSS REFERENCE TO RELATED APPLICATIONS

The Present application claims priority from Japanese Patent Application No. 2020-009317 of Totani et al., filed on Jan. 23, 2020, the entire disclosure of which is incorporated herein by reference.

BACKGROUND

1. Technical Field

The present invention relates to an airbag cover for use in an airbag device including an inflatable airbag for protecting a vehicle occupant. More particularly, the invention relates to an airbag cover that covers an airbag in a folded shape and is configured to provide an emergence opening for allowing the airbag to deploy therefrom.

2. Description of Related Art

JP 2009-248907 A discloses a known airbag cover disposed in an instrument panel of a vehicle. The airbag cover includes a substrate fabricated from synthetic resin such as polypropylene, and a skin layer bonded to a front surface of the substrate and composed of a skin material such as leather or the like. The airbag cover covers an airbag in a folded shape and is configured to provide an emergence opening for allowing the airbag to deploy therefrom. The emergence opening is formed in both of the substrate and skin layer. The substrate includes a tear seam which is formed generally into an H-shape as viewed from above and composed of a recess denting from a back surface toward the front surface of the substrate, and double doors on both sides of a crossbar portion of the H-shaped tear seam. The emergence opening in the substrate is formed by tear of the tear seam and subsequent opening of the doors. The skin layer includes a breakable region which is formed into a generally straight line including a central portion disposed above the crossbar portion of the tear seam and two extended portions extending from opposite ends of the central portion. The emergence opening of the skin layer is formed by breakage of this linear breakable region. More particularly, the breakable region in the skin layer is comprised of a sewn seam that sews terminal edges of the skin material together. To describe in terms of bondage of the skin layer to the substrate, the skin layer includes, in a generally triangular area which is disposed outside of each of left and right vertical-bar portions of the H-shaped tear seam and has its substrate in an entirety of the left/right vertical-bar portion, a non-bonded region in which the skin layer is not bonded to the substrate. Except the non-bonded region, the skin layer is entirely bonded to the substrate. The extended portions of the breakable region are disposed in the non-bonded regions of the skin layer, that is, outside of the doors of the substrate.

At airbag deployment in the above airbag cover, the tear seam in the substrate tears, the double doors in the substrate open, then the sewn seam in the central portion of the breakable region in the skin layer breaks. The breakage of the breakable region runs to the extended portions since the extended portions are disposed in the non-bonded regions in which the skin layer is not bonded to the substrate, thus an entirety of the breakable region in the skin layer is broken to form an emergence opening having a generally oval shape which has a greatest width in a center in a left and right direction. The airbag deploys from this emergence opening.

In the above airbag cover, the breakable region in the skin layer is composed of the sewn seam, and the emergence opening is formed by breakage of the breakable region (i.e. sewn seam) running to the extended portions in the regions outside of the doors of the substrate. In a skin layer in which the breakable region is not composed of a sewn seam, the breakable region will not break easily in regions outside of doors of the substrate, and there will be a fear of scatter of the skin layer or a fear that the airbag as being inflated will go into a back side of the skin layer which has failed to be torn.

It would be desirable to provide an airbag cover that is able to form an airbag emergence opening smoothly by breaking a skin layer bonded to a front surface of a substrate adequately.

SUMMARY

An exemplary embodiment of the invention relates to an airbag cover that covers a folded airbag and is configured to provide an emergence opening which allows the airbag to deploy therefrom. The airbag cover includes a substrate and a skin layer adhered to a front surface of the substrate. The substrate includes: a tear seam that is formed generally into an H-shape as viewed from above and is composed of a recess denting from a back surface toward a front surface of the substrate, the tear seam including a crossbar portion of the H-shape and two vertical-bar portions which extend in both directions from opposite ends of the crossbar portion; and double doors that are disposed on both sides of the crossbar portion and configured to open in opposite directions from the crossbar portion for forming the emergence opening when the tear seam tears. The skin layer includes: a breakable region that is formed into a generally straight line and configured to break to form the emergence opening, the breakable region including a central portion which extends along the crossbar portion of the tear seam in the substrate immediately above the crossbar portion, and two extended portions which extend from opposite ends of the central portion to outside of the vertical-bar portions; and an unadhered region in which the skin layer is not adhered to the substrate, the unadhered region being disposed at least in two band-shaped areas in the extended portions of the breakable region. Each of the band-shaped areas extends from each of the vertical-bar potions of the tear seam in the substrate in such a manner as to be extended from the crossbar portion. Each of the band-shaped areas has a width smaller than a length of each of the vertical-bar portions.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Figure 1:
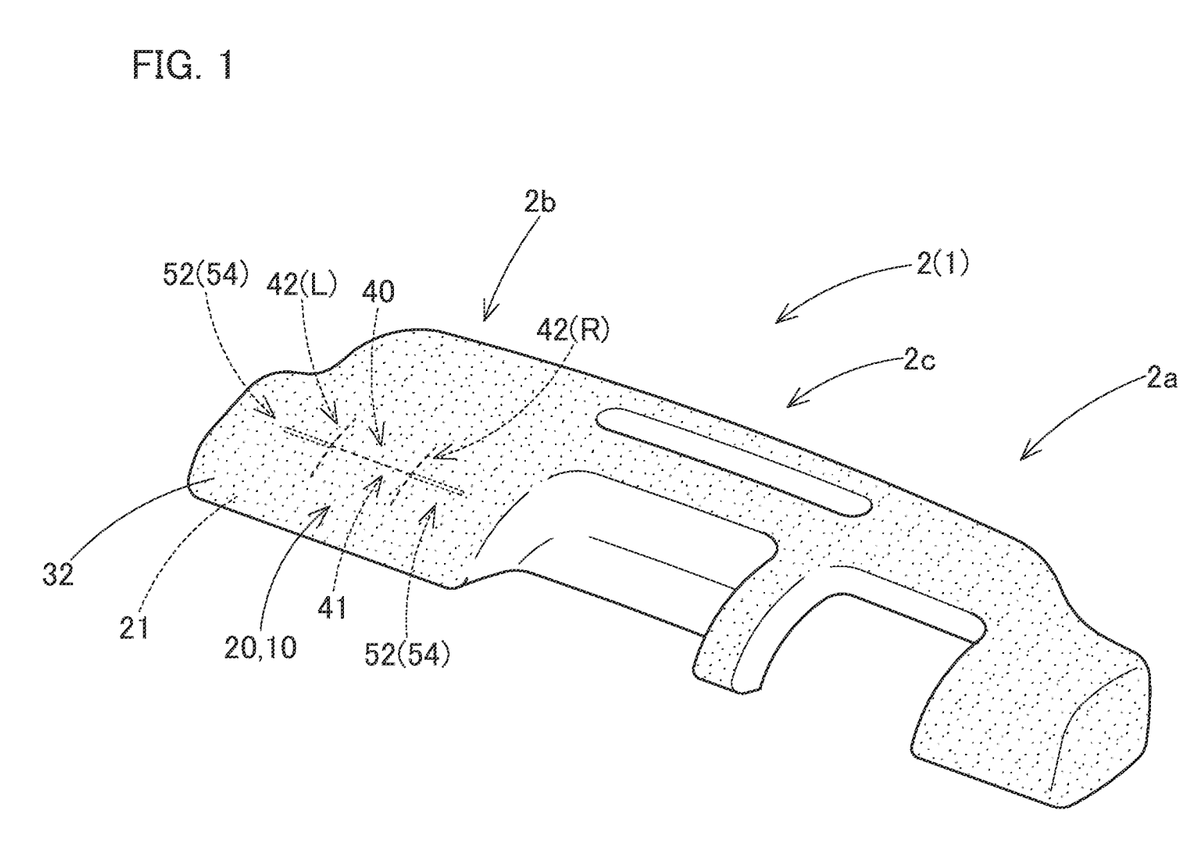
FIG. 1 is a schematic perspective view of an airbag device employing an airbag cover in accordance with an exemplary embodiment.
Figure 2:
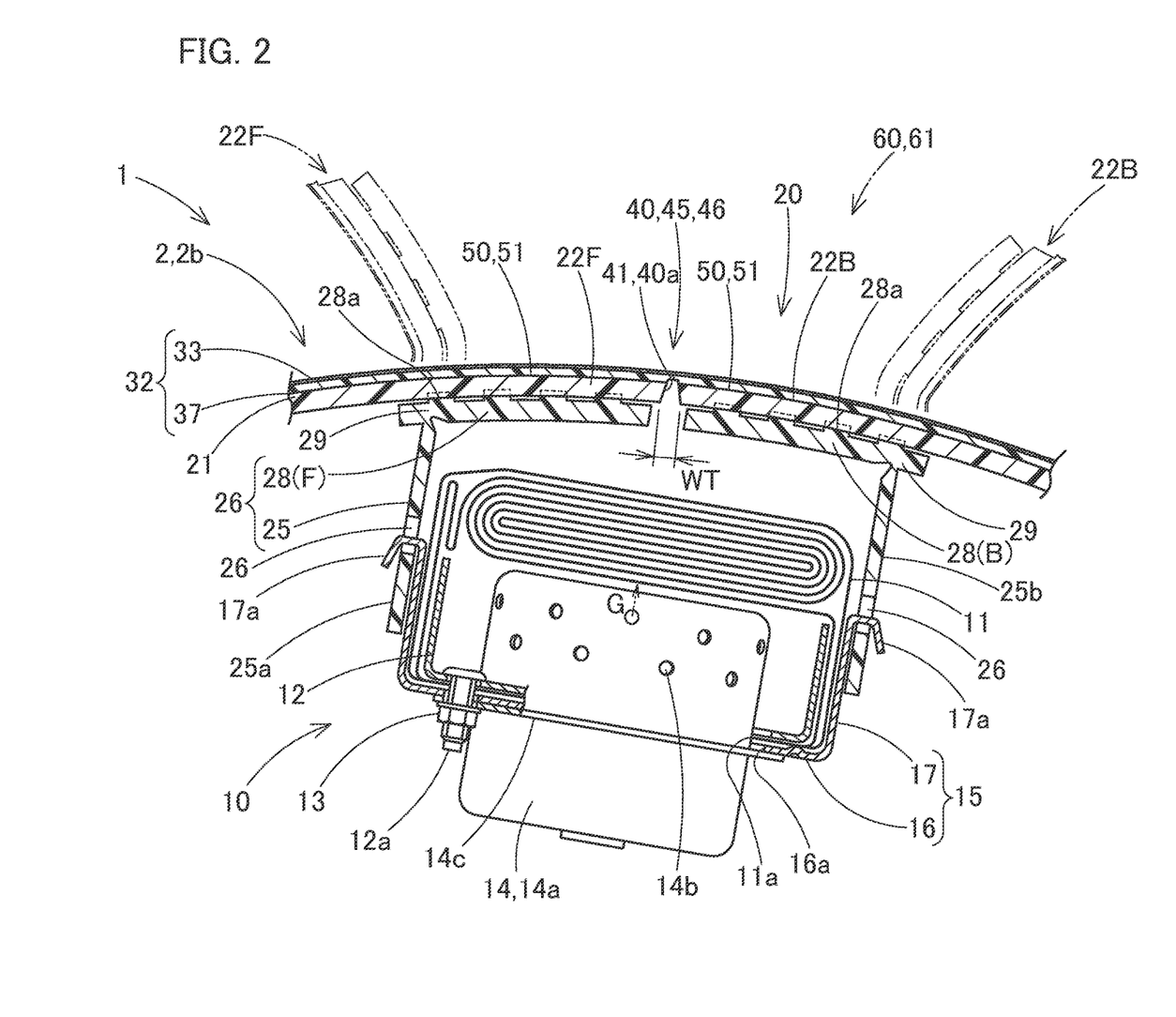
FIG. 2 is a schematic vertical sectional view of the airbag device of FIG. 1.

As shown in FIGS. 1 and 2, an airbag cover 20 in accordance with an exemplary embodiment is used in an airbag device 10 for a passenger seat and disposed in an instrument panel or dashboard 2 of a vehicle 1. The dashboard 2 is disposed in front of front seats of the vehicle 1, and includes a driver-side portion 2a disposed in front of a driver's seat, a passenger-side portion 2b disposed in front of a passenger seat, and a central portion 2c disposed in front of a not-shown center console. The airbag cover 20 is disposed in the passenger-side portion 2b so as to provide emergence openings 60, 61 for allowing an airbag 11 (FIG. 2) to deploy there from smoothly, as will be described later.

Referring to FIG. 2, the airbag device 10 includes a case (as a storage) 15, an airbag 11 which is stored in the case 15 in a folded shape and configured to be inflated with an inflation gas G and deploy from the case 15 via the emergence openings 60, 61 for protecting a passenger sitting in the passenger seat, an inflator 14 which is stored in the case 15 and configured to feed the airbag 11 with the inflation gas G, and an airbag cover 20 which covers the airbag 11. The case 15 is mounted on a vehicle body structure through the use of not-shown brackets, and the airbag cover 20 is connected with the case 15 by its case-side portion 25, as will be described later. The dashboard 2 on which the airbag cover 20 is mounted is held by the vehicle body structure by the outer peripheral edge or the like.

The airbag 11 is designed to be inflated generally into a truncated square cone tapering toward the front end, and has a receiving surface for receiving the passenger at the rear end. The airbag 11 includes a round inlet port 11a for receiving an inflation gas G in a lower side of the front end region. The airbag 11 is mounted on a bottom wall 16 of the case 15 by a periphery of the inlet port 11a through the use of a retainer 12. The retainer 12 is formed generally into a square annular shape, and includes four bolts 12a extending downwardly from its four corners. The retainer 12 is inserted into the airbag 11 so that the bolts 12a go through the periphery of the inlet port 11a of the airbag 11, the bottom wall 16 of the case 15, and a later-described flange 14c of the inflator 14, then the bolts 12a are fastened with nuts 13. Thus the airbag 11 and inflator 14 are mounted on the bottom wall 16 of the case 15.

The inflator 14 includes a body portion 14a which has a generally pot-like shape and is provided with numerous gas discharge ports 14b in the upper region, and a flange 14c which protrudes from an outer circumference of the body portion 14a and allows the bolts 12a of the retainer 12 to pass.

The case 15 includes a bottom wall 16 having a generally rectangular plate shape and a side wall 17 extending upward from an outer edge of the bottom wall 16 generally in a square tubular shape. The bottom wall 16 includes an insert hole 16a for receiving the body portion 14a of the inflator 14 from below, and through holes (reference signs omitted) for receiving the bolts 12a of the retainer 12 in a periphery of the insert hole 16a. As described above, the periphery of the inlet port 11a of the airbag 11 and flange 14c of the inflator 14 are secured to the bottom wall 16 of the case 15 through the use of the bolts 12a of the retainer 12 and nuts 13. A plurality of retaining hooks 17a are arranged in a left and right direction in front and rear portions of the side wall 17 for engagement with later-described retaining holes 26 of the case-side portion 25 of the airbag cover 20.

Referring to FIGS. 1 to 5, the airbag cover 20 includes a substrate 21 and a skin layer 32 adhered to a front surface (or outer surface) of the substrate 21 with adhesive 50. The substrate 21 is made from synthetic resin such as polypropylene. The substrate 21 and skin layer 32 are disposed in the driver-side portion 2a and central portion 2c of the dashboard 2 as well, but the airbag cover 20 in the passenger-side portion 2b further includes a connecting member 24 used for connection with the case 15. The connecting member 24 is made from thermoplastic resin of olefin or the like.

The connecting member 24 includes a case-side portion 25 which is formed generally into a square tubular shape and encircles the side wall 17 of the case 15, and two door-side portions 28 (28F, 28B) attached to a back surface of the substrate 21. The case-side portion 25 is provided with a plurality of retaining holes 26 for receiving the retaining hooks 17a of the case 15 in the front wall portion 25a and back wall portion 25b, as described above. The door-side portions 28F, 28B are separated from each other in a front and rear direction and each welded to back surfaces of later-described doors 22F, 22B of the substrate 21. Each of the door-side portions 28F, 28B are provided with a plurality of elongated projections 28a in the upper surface. The door-side portions 28F, 28B are welded to the back surfaces of the doors 22F, 22B by the elongated projections 28a by vibration welding or the like. Each of the door-side portions 28F, 28B further includes, in a vicinity of the front wall portion 25a/back wall portion 25b of the case-side portion 25, a hinge portion 29 that is so thinned as to make the door-side portion 28F/28B open easily along with the door 22F/22B.

The substrate 21 in the airbag cover 20 includes, in an area where the connecting member 24 is disposed, double doors 22 (22F, 22B) which cover the airbag 11 as folded and are configured to open in opposite directions to form an emergence opening 60 when pushed by the airbag 11 as actuated.

Figure 4:
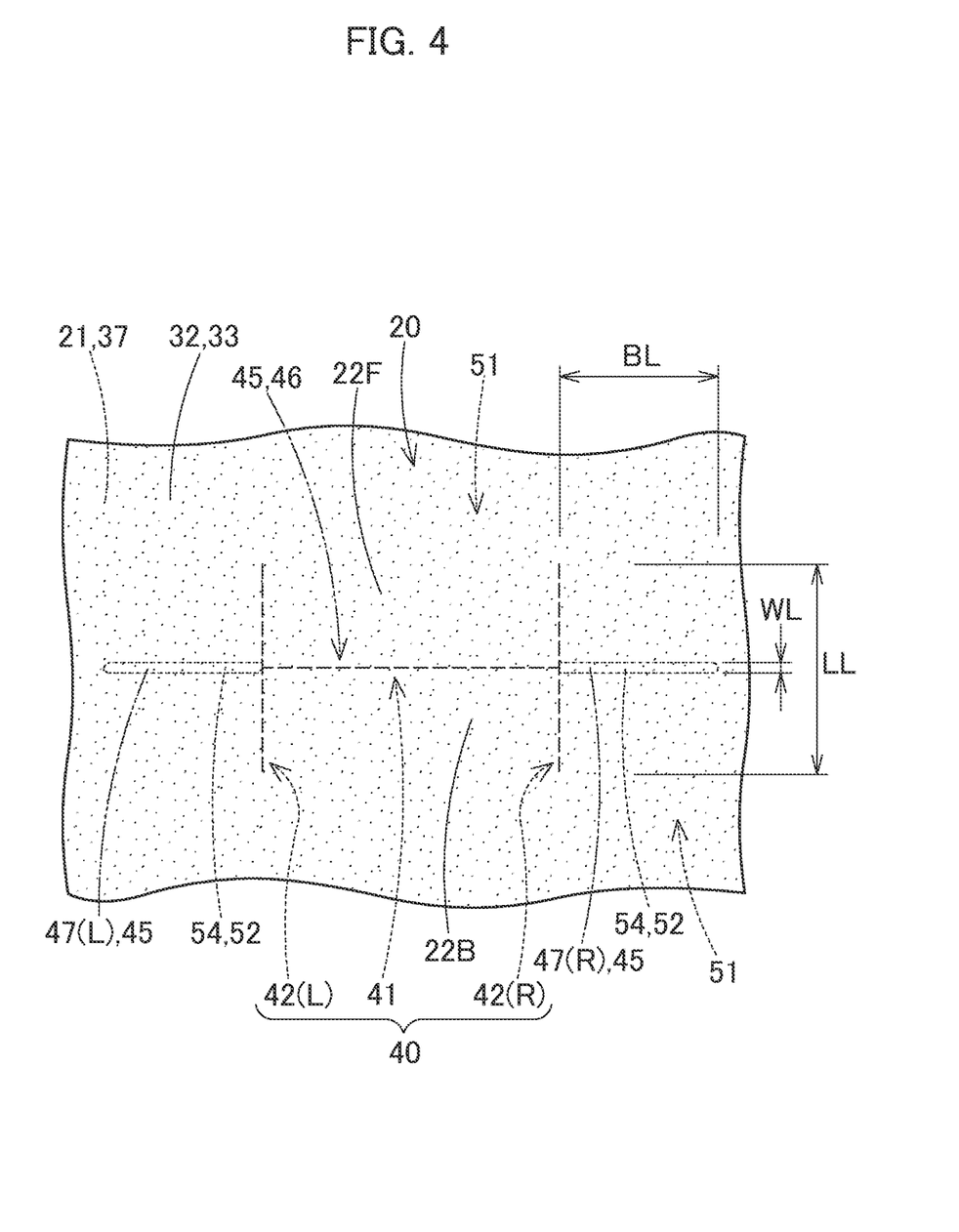
FIG. 4 is a schematic plan view of the airbag cover in accordance with the exemplary embodiment showing a tear seam.

The emergence opening 60 of the substrate 21 is formed by tear of a tear seam 40 formed in peripheral edges of the doors 22F, 22B. The tear seam 40 is formed generally into an H-shape as viewed from above and is composed of a recess (a generally V-groove, in this specific embodiment) 40a denting from the back surface toward the front surface of the substrate 21. The tear seam 40 includes a crossbar portion 41 of the H-shape and two vertical-bar portions 42 (42L, 42R) of the H-shape which extend both in front and rear directions from left and right ends of the crossbar portion 41. When the tear seam 40 tears, the double doors 22F, 22B disposed on both front and back sides of the crossbar portion 41 between the vertical-bar potions 42L, 42R open forward and backward, respectively. As described above, the door-side portions 28F, 28B of the connecting member 24 are welded to the back surfaces of the doors 22F, 22B, respectively.

Figure 3:
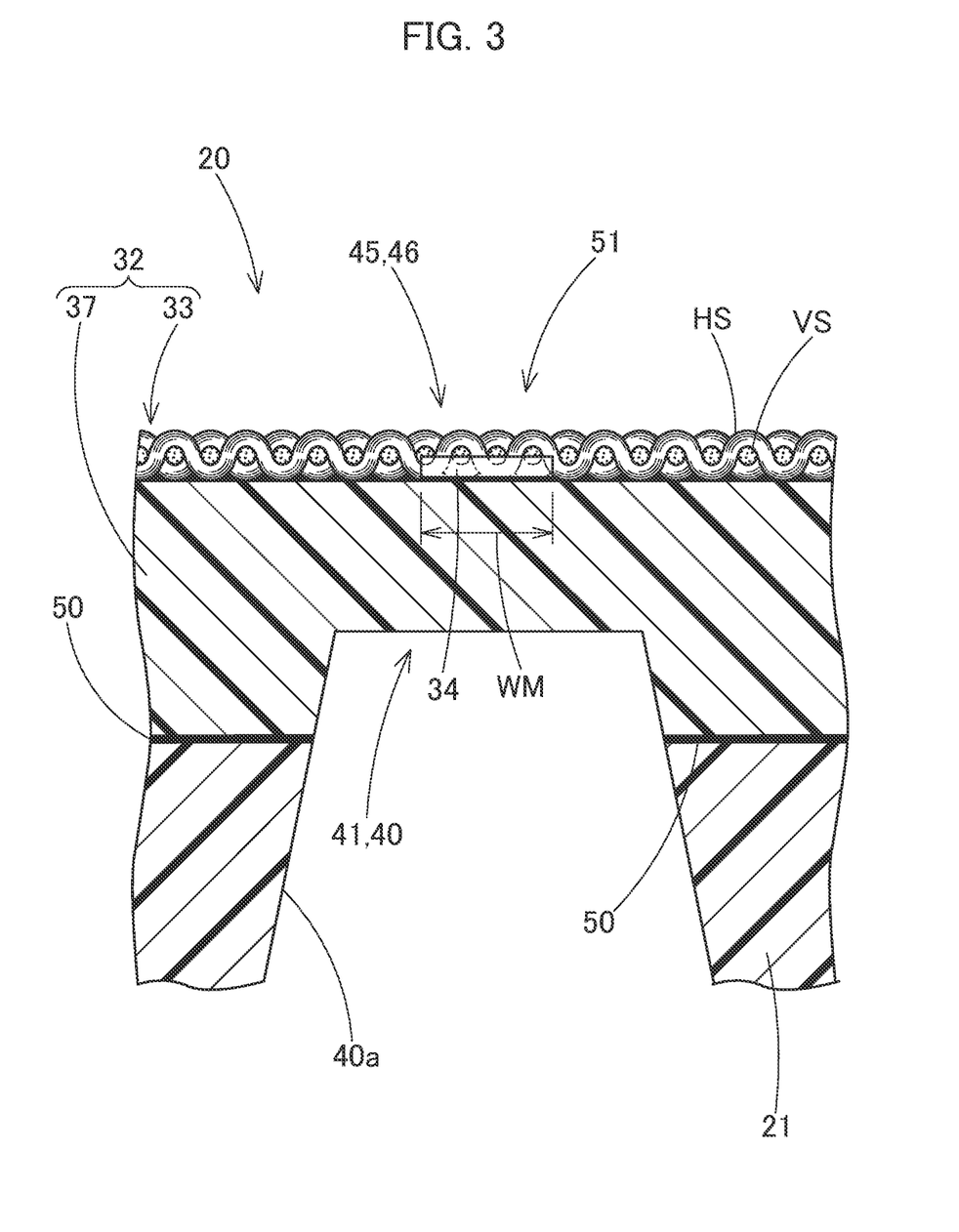
FIG. 3 is a schematic vertical sectional view of the airbag cover in accordance with the exemplary embodiment showing a low-strength region in a skin layer of the airbag cover.

As shown in FIGS. 2 and 3, the skin layer 32 is formed into a sheet including a fabric layer (as an outer skin) 33 disposed on the outer surface and a cushion layer 37 having a sheet shape and adhered to the fabric layer 33. The fabric layer 33 is composed of a fabric woven with warps VS and wefts HS both of which are of polyester or the like. The cushion layer 37 is composed of a cushioning material made of foam material of polypropylene, urethane or the like.

Figure 5:
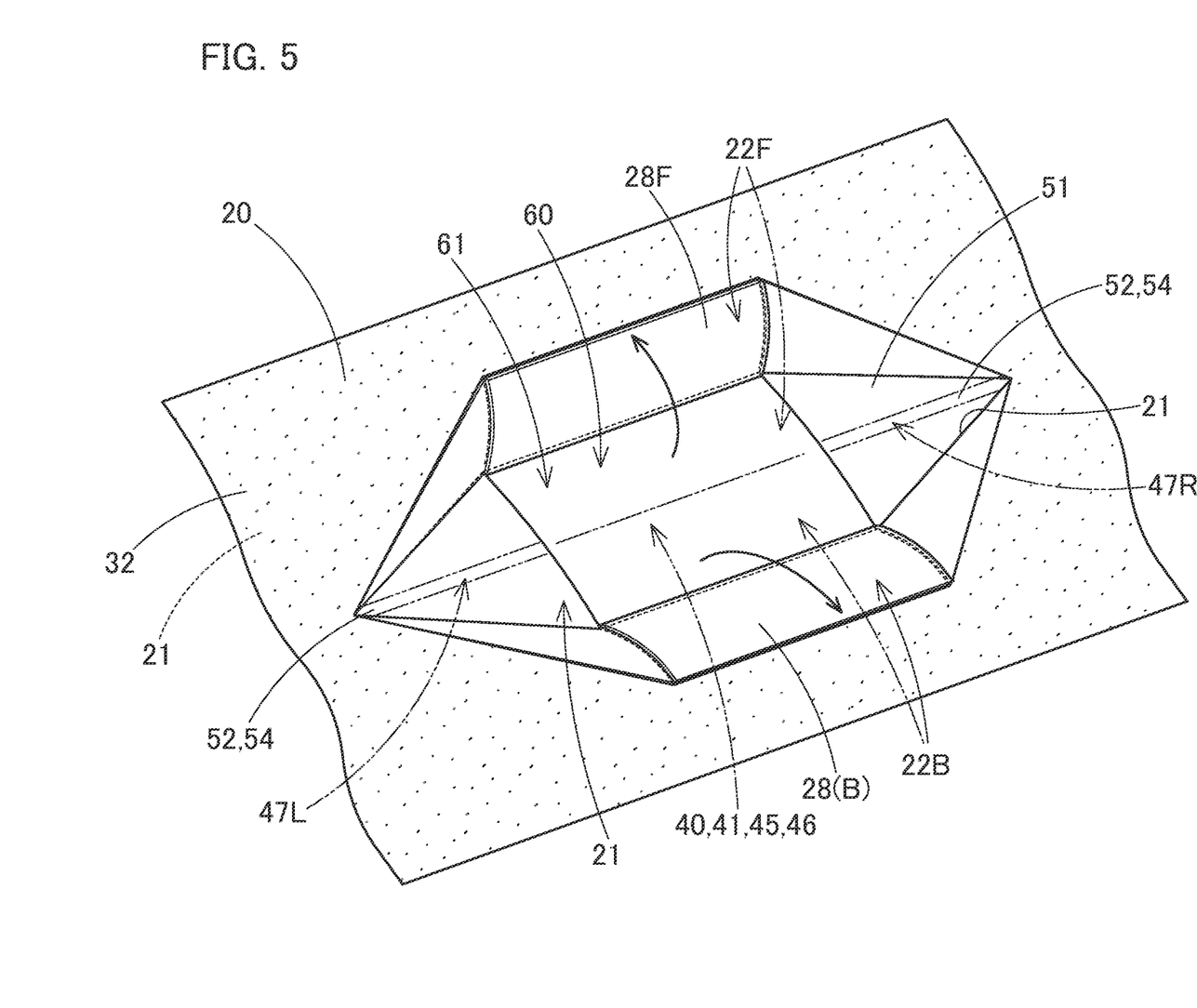
FIG. 5 is a schematic perspective view of the airbag cover in accordance with the exemplary embodiment at opening of an emergence opening.

The emergence opening 61 of the skin layer 32 is formed by breakage of a breakable region 45. As shown in FIG. 4, the breakable region 45 is formed into a generally straight line including a central portion 46 which extends along the crossbar portion 41 of the tear seam 40 immediately above the crossbar portion 41, and two extended portions 47 (47L, 47R) which extend from left and right ends of the central portion 46 straightly in the left and right direction to the outside of the vertical-bar portions 42 (42L, 42R). The emergence opening 61 is designed to open generally into an oval shape having a sufficient width in the front and rear direction for letting the airbag 11 out smoothly, as shown in FIG. 5.

Although the skin layer 32 is adhered to the substrate 21, it includes, in the extended portions 47L, 47R of the breakable region 45, two unadhered regions 52 in which the skin layer 32 is not adhered to the substrate 21. Each of the unadhered regions 52 is formed in a band-shaped area 54 which extends from the vertical-bar portion 42L/42R of the tear seam 40 in the substrate 21 towards the left/right in such a manner as to be extended from the crossbar portion 41 of the tear seam 40, like an extension of the crossbar portion 41. Further, each of the unadhered regions 52 (i.e. the band-shaped areas 54) has a width WL (FIG. 4) smaller than a length LL (FIG. 4) of the vertical-bar portion 42.

As shown in FIG. 3, the fabric layer 33 of this embodiment includes, in the back surface, a low-strength region 34 that has been subjected to a process of reducing the thickness to promote breakage of the breakable region 45. The low-strength region 34 of this embodiment is composed of an elongated recess formed by milling, ultrasonic cutter, a heated blade or the like for reducing a sectional area or thickness of the fabric layer 33, and is formed to extend in the left and right direction in an entire area of the skin layer 32, immediately above the crossbar portion 41 of the tear seam 40 in the substrate 21. Since the low-strength region 34 has only to be low in tensile strength of the fabric layer 33, it may alternatively be composed of a plurality of cut-out or recessed regions. Further alternatively, the low-strength region 34 may be formed by thinning the warps VS and/or wefts HS partially by cutting, grinding or the like. It is needless to say that the low-strength region 34 is designed with depth and width in consideration so as not to affect the appearance of an outer surface of the fabric layer 33.

In this embodiment, a width WM (FIG. 3) of the low-strength region 34 is 2.5 mm which is in a range of approximately 1 to 5 mm in order to have no impact on the appearance of the outer surface of the fabric layer 33 and guide a breakage of the fabric layer 33 smoothly.

The length LL of each of the vertical-bar portion 42 (42L, 42R) of the tear seam 40 in the substrate 21 is approximately 130 mm so that the emergence opening 60 be large enough to let the airbag 11 out smoothly. A length BL (FIG. 4) of each of the band-shaped areas 54 forming the unadhered regions 52 is approximately 60 mm so that the emergence opening 61 has a necessary and sufficient opening width.

Further, the width WL of each of the band-shaped areas 54 (i.e. the unadhered regions 52) is 5 mm which is in a range of approximately 3 to 10 mm so that the unadhered regions 52 trigger the breakage of the extended portions 47 surely following the breakage of central portion 46 of the breakable region 45 without causing scatter of the skin layer 32. The width WL of each of the band-shaped areas 54 is greater than the width WM of the low-strength region 34. That is, the width WM of the low-strength region 34 is smaller than the width WL of each of the band-shaped areas 54.

Production of the airbag cover 20 in accordance with the exemplary embodiment is now described. Firstly, an instrument panel (dashboard) 2 is formed as follows: A fabric layer 33, which has been provided with a low-strength region 34 in advance, and a cushion layer 37, which has an adhesive layer on the front surface in advance, are provided. The fabric layer 33 is bonded to the cushion layer 37 by vacuum forming, thus forming a skin layer 32. Then the skin layer 32 is fixed to the substrate 21, which is provided with an adhesive layer 50 in advance in a region 51 except an unadhered regions 52, by applying pressure. Subsequently, an end mill or the like is used to form a tear seam 40 in the substrate 21, the door-side portions 28F, 28B of the connecting member 24 are welded to the doors 22F, 22B of the substrate 21, respectively, thus forming the instrument panel 2 provided with the airbag cover 20.

Thereafter, the retainer 12 is inserted into the airbag 11, the airbag 11 is folded and wrapped with a not-shown wrapping member, then stored in the case 15. At this time, the bolts 12a of the retainer 12 protrude downwardly from the bottom wall 16 of the case 15. Then the body 14a of the inflator 14 is set in the insert hole 16a of the case 15 from below so that the bolts 12a of the retainer 12 go through the flange 14c of the inflator 14, then the bolts 12a are fastened with the nuts 13. Thus, the airbag 11 and inflator 14 are mounted on the case 15.

Thereafter, the instrument panel 2 is mounted on the vehicle body 1, and the case 15 is coupled with the airbag cover 20 by inserting the retaining hooks 17a of the case 15 into the retaining holes 26 of the case-side portion 25 of the airbag cover 20. If then not-shown lead wires extending from a control device for actuating the airbag device 10 are connected to the inflator 14, the airbag device 10 is mounted on the vehicle body 1.

If the airbag device 10 as mounted on the vehicle 1 is actuated, the inflator 14 feeds the airbag 11 with an inflation gas G to inflate the airbag 11. The inflated airbag 11 pushes and tears the tear seam 40 in the substrate 21 of the airbag cover 20 to open the doors 22F, 22B disposed on both sides of the crossbar portion 41 of the tear seam 40, so that a generally rectangular emergence opening 60 is formed in the substrate 21. Then the central portion 46 of the breakable region 45 in the skin layer 32, which has been adhered to the doors 22F, 22B, breaks, and the breakage is going to advance to the extended portions 47L, 47R. There in the extended portions 47L, 47R in the skin layer 32, the unadhered regions 52 are disposed in such a band shape as to be extended from the crossbar portion 41 of the tear seam 40. Therefore, the skin layer 32 in the unadhered regions 52 is separated from the substrate 21 without hindering opening movement of the doors 22F, 22B. Further, since each of the band-shaped unadhered regions 52 has the width WL smaller than the length LL of the vertical-bar portion 42L, 42R of the tear seam 40 in the substrate 21, stress concentration easily occurs in the unadhered regions 52, so that the breakage of the central portion 46 smoothly propagates to the extended portions 47L, 47R. Thus the breakable region 45 of the skin layer 32 formed into a straight line is broken adequately to form an emergence opening 61 having a desired opening width without making the skin layer 32 scatter, and the airbag 11 protrudes smoothly from the emergence openings 60, 61 of the substrate 21 and skin layer 32 without going into a backside of the skin layer 32.

Therefore, the airbag cover 20 in accordance with the exemplary embodiment is able to provide the airbag emergence opening 60, 61 smoothly by breaking the skin layer 32 bonded to the front surface of the substrate 21 adequately.

As shown in FIG. 5, when the emergence opening 61 is formed, the skin layer 32 in the adhered region 51 in a vicinity of the unadhered regions 52 in the extended portions 47L, 47R is detached from the substrate 21 and exposes the substrate 21.

Figure 6:
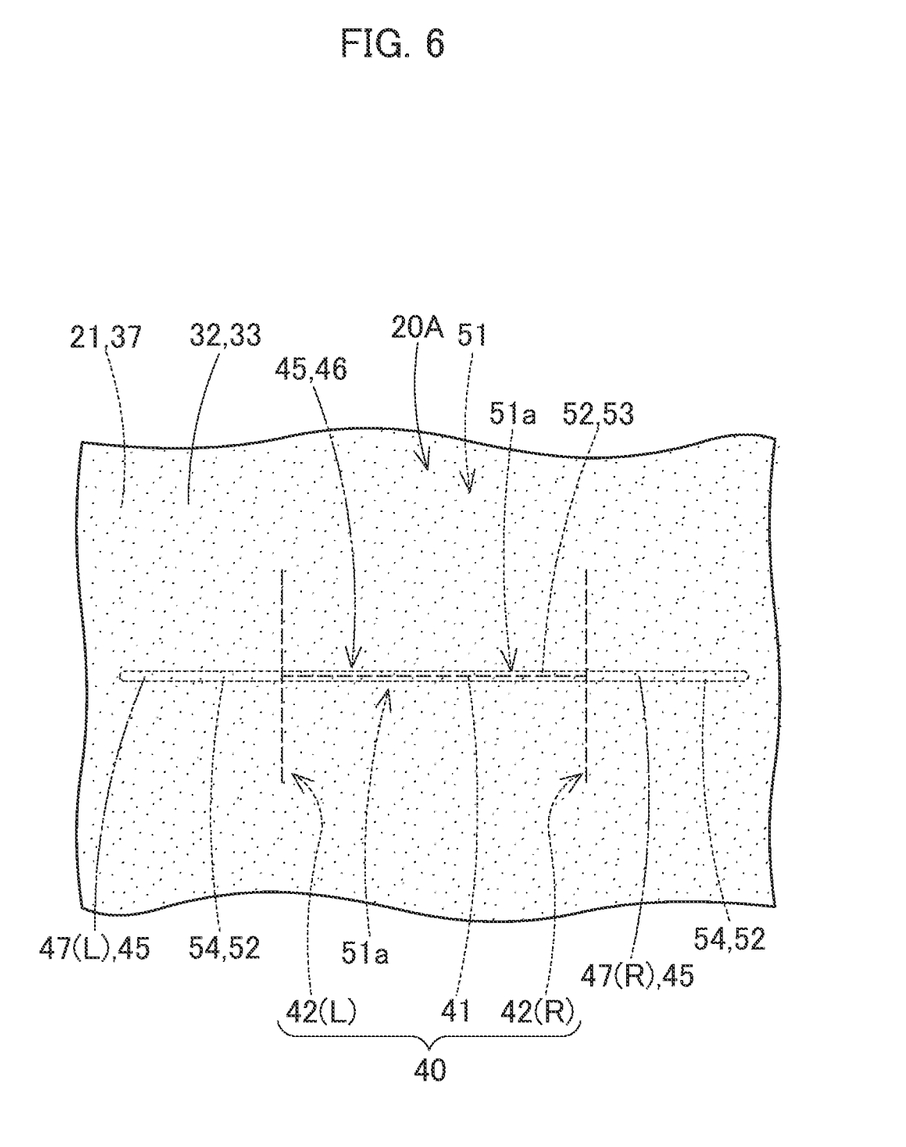
FIG. 6 is a schematic plan view of an airbag cover in accordance with an alternative embodiment.

In the airbag cover 20 in accordance with the exemplary embodiment, the unadhered region 52 of the skin layer 32 is disposed only in the band-shaped areas 54 which extend respectively from the vertical-bar portions 42L, 42R of the tear seam 40 in the substrate 21 in such a manner as to be extended from the crossbar portion 41 of the tear seam 40. However, the unadhered region 52 may also be formed in an upper area 53 in the skin layer 32 which is disposed on the crossbar portion 41 of the H-shaped tear seam 40, as in an airbag 20A depicted in FIG. 6. The upper area 53 has a same width WL as those of the band-shaped areas 54.

When the crossbar portion 41 of the tear seam 40 in the airbag cover 20A configured as described above is torn, as shown in FIG. 6, adjoining regions 51a of the adhered region 51 which adjoin the upper area (i.e. unadhered region 52) 53 on both sides will pull the upper area 53 in both front and back directions in accordance with opening of the doors 22F, 22B. This will cause stress concentration in the upper area (i.e. unadhered region 52) 53, and the upper area (i.e. unadhered region 52) 53 will tear easily so that the tear propagates to the extended portions 47L, 47R quickly. Therefore, the breakable region 45 in the skin layer 32 adhered to the substrate 21 will be further smoothly and adequately torn.

In the airbag cover 20 in accordance with the exemplary embodiment, the skin layer 32 includes the fabric layer 33 forming the outer surface of the skin layer 32 and the cushion layer 37 having a sheet shape and adhered to the fabric layer 33, and the low-strength region 34 for promoting breakage of the breakable region 45 is formed in the back surface of the fabric layer 33.

The low-strength region 34 will serve as a starting point of fracture of the breakable portion 45 or predetermine the path of fracture of the breakable portion 45 even if the fabric layer 33 is made from a material difficult to fracture. Therefore, the low-strength region 34 will help form the emergence opening 61 in the skin layer 32 smoothly. Further, since the fabric layer 33 forming the outer surface is composed of woven fabric, knitted fabric or the like, it improves appearance and/or touch of the airbag cover 20.

Figure 7:
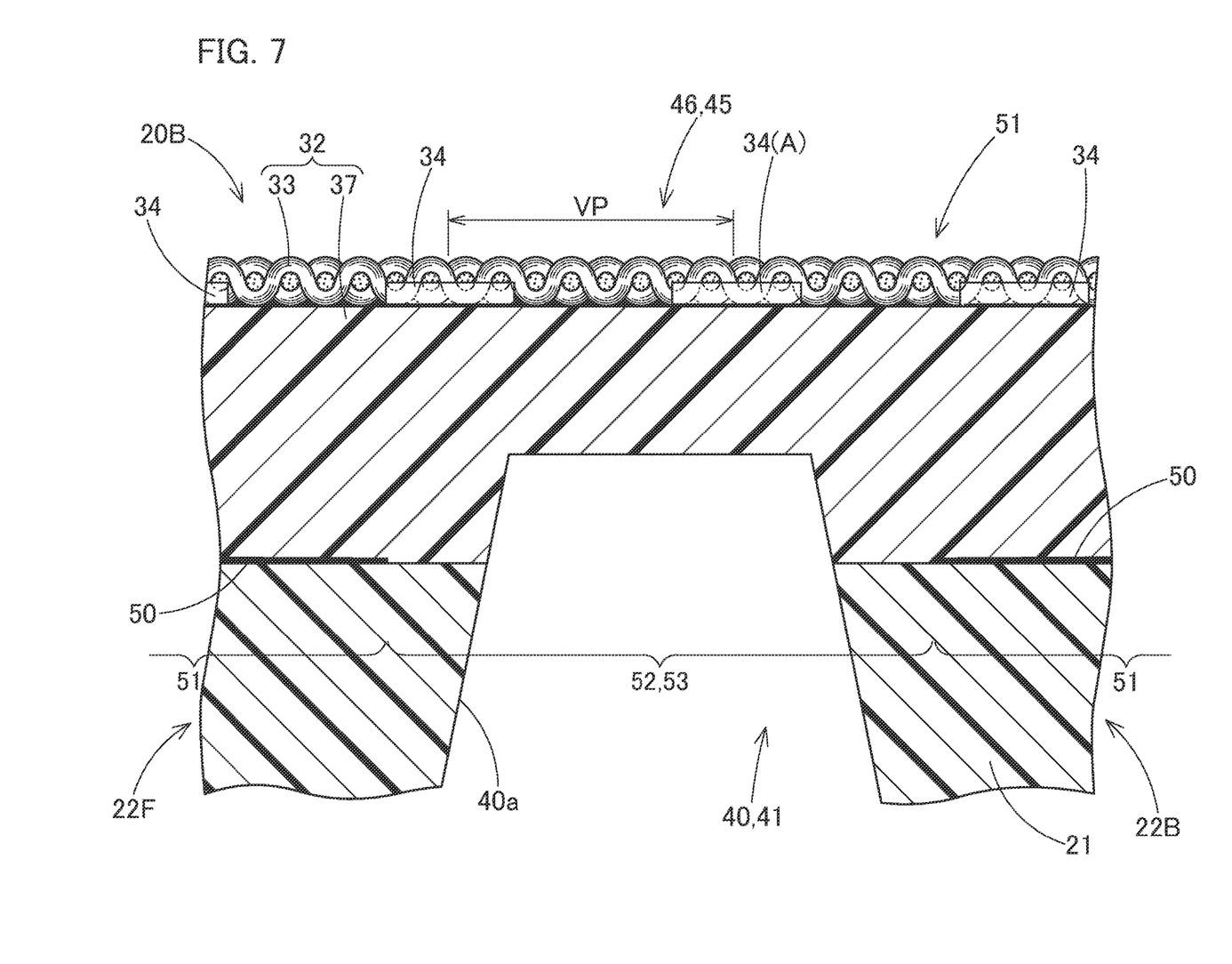
FIG. 7 is a schematic vertical sectional view of an airbag cover in accordance with another alternative embodiment.

In the airbag cover 20 in accordance with the exemplary embodiment, a single low-strength region 34 is formed to extend along the crossbar portion 41 of the tear seam 40 immediately above the crossbar portion 41. In other embodiments, a plurality of the low-strength regions 34 may be arranged generally in parallel to one another in a vicinity of the crossbar portion 41 of the tear seam 40, as in an airbag cover 20B depicted in FIG. 7. In other words, the low-strength regions 34 are arranged generally in parallel to one another in a vicinity of the crossbar portion 41 of the tear seam 40.

If the skin layer 32 of the airbag cover 20B provided with a predetermined unadhered region 52 (the airbag cover 208 depicted in FIG. 7 has the unadhered regions 52 not only in the band-shaped areas 54 but also in the upper area 53) is adhered to the front surface of the substrate 21 so that each of the low-strength regions 34 extends along the crossbar portion 41 of the tear seam 40, one of the low-strength regions 34 will be disposed in proximity to the crossbar portion 41 of the tear seam 40. If then the tear seam 40 in the substrate 21 is torn and the doors 22F, 22B open at airbag deployment, stress concentration will occur in the low-strength region 34(A) which is in proximity to the crossbar portion 41 of the tear seam 40 among the plurality of the low-strength regions 34, and the low-strength region 34(A) will easily fracture and the fracture will propagate from the upper area 53 to the band-shaped areas 54 quickly and smoothly. That is, with the configuration of the airbag cover 20B, the emergence opening 61 will be formed smoothly in the skin layer 32 so that the airbag 11 is deployed from the emergence opening 61, without paying special attention to positioning of the low-strength region 34 with respect to the crossbar portion 41 of the tear seam 40. Thus, the configuration of the airbag cover 20B will facilitate the positioning of the skin layer 32 with respect to the substrate 21.

If one of the low-strength regions 34 arranged in parallel to one another is disposed exactly above the crossbar portion 41 of the tear seam 40 in such a manner as to overlap with the upper area 53 on the crossbar portion 41 and the band-shaped areas 54, a pitch VP (FIG. 7) each between the low-strength regions 34 may be smaller than a width WT (FIG. 2) of the recess 40a of the tear seam 40.

Of course, insofar as the emergence opening 61 having a desired opening width is formed smoothly without scatter of the fabric layer 33 at airbag deployment, the low-strength regions 34 may be slightly dislocated from the upper area 53 on the crossbar portion 41 of the tear seam 40 and the band-shaped areas 54, and the pitch VP between the low-strength regions 34 may be equal to or greater than the width WI of the recess 40a.

The number of the low-strength regions 34 may be two or three so that one of the low-strength regions 34 is disposed in a vicinity of the band-shaped areas 54 and/or upper area 53, or alternatively, two to ten low-strength regions 34 may be arranged in such a manner as to encompass the band-shaped areas 54 and/or upper area 53. With respect to an arrangement area in length direction of the low-strength region 34, the low-strength regions 34 may be arranged only within an area of the breakable region 45. Even in an instance where only one low-strength region 34 is formed, it may be arranged only within the area of the breakable region 45.

Figure 8:
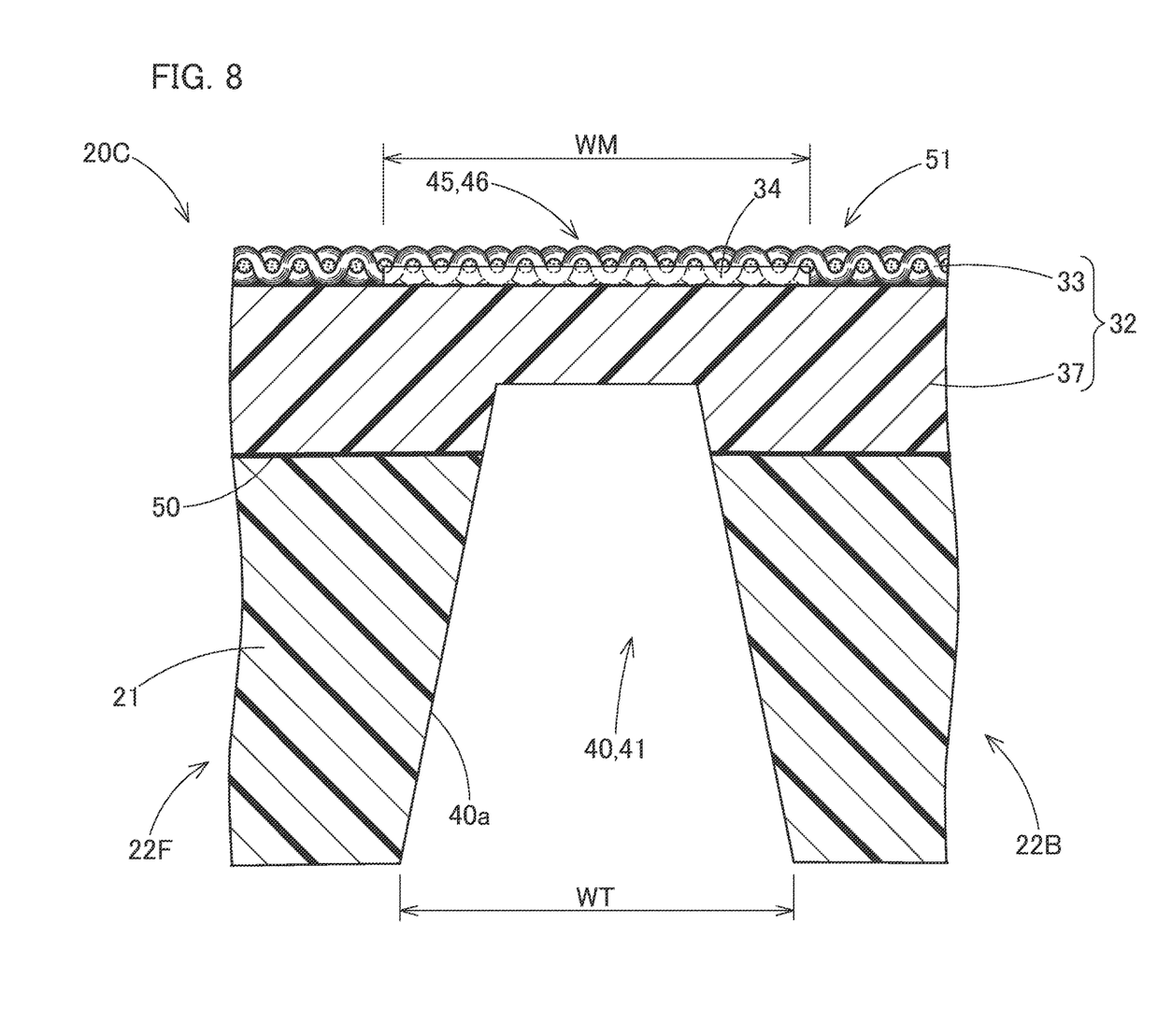
FIG. 8 is a schematic vertical sectional view of an airbag cover in accordance with yet another alternative embodiment.

When only one low-strength region 34 is formed, insofar as the emergence opening 61 is formed smoothly without scatter of the fabric layer 33 at airbag deployment, the low-strength region 34 may be configured to have a width WM greater than the width WT of the recess 40a of the tear seam 40, as in an airbag cover 200 depicted in FIG. 8.

Although the skin layer 32 in the foregoing embodiment uses the fabric layer 33 as an outer skin, the outer skin of the skin layer 32 may be composed of natural leather, synthetic leather, non-woven fabric or the like, which may require sewing work. In this case, it is conceivable to locate a sewn seam of the leather material in the band-shaped areas 54 and upper area 53 to form the breakable region 45.

Although the skin layer 32 in the foregoing embodiments includes the fabric layer 33 and cushion layer 37, the skin layer may have one-layer structure of an outer skin such as the fabric layer 33 and leather.

In the foregoing embodiments, the recess 40a forming the tear seam 40 in the substrate 21 reaches the cushion layer 37 of the skin layer 32 as shown in FIGS. 2, 3, 7 and 8, the recess 40a may be formed only in the substrate 21.

In the airbag cover in accordance with the exemplary embodiments, the skin layer 32 includes, in the back side of the fabric layer 33, a low-strength region 34 which is formed by forming a groove or a recess or the like, cutting, cutting out a portion, reducing a sectional area or the like for ensuring a smooth fracture of the breakable region 45 in the fabric layer 33. The airbag cover provided with such a low-strength region will smoothly fracture at the breakable region 45 without sacrificing appearance and touch. The airbag cover may be configured such that the fabric layer 33 is provided with a predetermined number of the low-strength regions and the skin layer 32 may be simply adhered to the substrate 21 without forming any unadhered regions.

The airbag cover in accordance with the exemplary embodiment covers a folded airbag and is configured to provide an emergence opening which allows the airbag to deploy therefrom. The airbag cover includes a substrate and a skin layer adhered to a front surface of the substrate. The substrate includes: a tear seam that is formed generally into an H-shape as viewed from above and is composed of a recess denting from a back surface toward a front surface of the substrate, the tear seam including a crossbar portion of the H-shape and two vertical-bar portions which extend in both directions from opposite ends of the crossbar portion; and double doors that are disposed on both sides of the crossbar portion and configured to open in opposite directions from the crossbar portion for forming the emergence opening when the tear seam tears. The skin layer includes: a breakable region that is formed into a generally straight line and configured to break to form the emergence opening, the breakable region including a central portion which extends along the crossbar portion of the tear seam in the substrate immediately above the crossbar portion, and two extended portions which extend from opposite ends of the central portion to outside of the vertical-bar portions; and an unadhered region in which the skin layer is not adhered to the substrate, the unadhered region being disposed at least in two band-shaped areas in the extended portions of the breakable region. Each of the band-shaped areas extends from each of the vertical-bar potions of the tear seam in the substrate in such a manner as to be extended from the crossbar portion. Each of the band-shaped areas has a width smaller than a length of each of the vertical-bar portions.

With the airbag cover in accordance with the exemplary embodiment, when the airbag is inflated, the tear seam in the substrate is torn and the doors disposed on both sides of the crossbar portion of the tear seam open, so that a generally rectangular emergence opening is formed in the substrate. Then the central portion of the breakable region in the skin layer, which has been adhered to the doors, breaks, and breakage is going to advance to the extended portions. There in the extended portions in the skin layer, the unadhered regions are disposed in such a band shape as to be extended from the crossbar portion of the tear seam. Therefore, the skin layer in the unadhered regions is separated from the substrate without hindering opening movement of the doors. Further, since each of the band-shaped unadhered regions has the width smaller than the length of the vertical-bar portion of the tear seam in the substrate, stress concentration easily occurs in the unadhered regions, so that the breakage of the central portion smoothly propagates to the extended portions. Thus the breakable region of the skin layer formed into a straight line is broken adequately to form an emergence opening having a desired opening width without making the skin layer scatter, and the airbag protrudes smoothly from the emergence openings of the substrate and skin layer without going into a backside of the skin layer.

Therefore, the airbag cover in accordance with the exemplary embodiment is able to provide the airbag emergence opening smoothly by breaking the skin layer bonded to the front surface of the substrate adequately.

The unadhered region may be disposed also in an area in the skin layer on the crossbar portion of the tear seam.

With this configuration, when the crossbar portion of the tear seam is torn, the unadhered region on the crossbar portion will be pulled in opposite directions by adjoining adhered regions in the skin layer in accordance with opening of the doors. This will cause stress concentration in the unadhered region on the crossbar portion, therefore the unadhered region on the crossbar portion will tear easily so that the tear propagates to the extended portions quickly. Therefore, the skin layer adhered to the substrate will be further smoothly and adequately torn.

In various embodiments, the skin layer includes a fabric layer forming an outer surface of the skin layer and a cushion layer having a sheet shape and adhered to the fabric layer, and the fabric layer includes, in the back surface, a low-strength region for promoting breakage of the breakable region.

The low-strength region will serve as a starting point of fracture of the breakable portion or predetermine the path of fracture of the breakable portion even if the fabric layer is made from a material difficult to fracture. Therefore, the low-strength region will help form the emergence opening in the skin layer smoothly. Further, since the fabric layer forming the outer surface is composed of woven fabric, knitted fabric or the like, it improves appearance and/or touch of the airbag cover.

In various embodiments, the low-strength region is formed to extend along the crossbar portion of the tear seam in the substrate, and a plurality of the low-strength regions are arranged generally in parallel to one another in a vicinity of the crossbar portion of the tear seam.

With this configuration, if the skin layer provided with a predetermined unadhered region (in the band-shaped areas only or in the band-shaped areas and in the area on the crossbar portion) is adhered to the front surface of the substrate so that each of the low-strength regions extends along the crossbar portion of the tear seam, one of the low-strength regions will be disposed in proximity to the crossbar portion of the tear seam. If then the tear seam in the substrate is torn and the doors open at airbag deployment, stress concentration will occur in the one of the low-strength region which is in proximity to the crossbar portion of the tear seam, and the one of the low-strength regions will easily fracture and the fracture will propagate from the area on the crossbar portion to the band-shaped areas quickly and smoothly. That is, the emergence opening will be formed smoothly in the skin layer so that the airbag is deployed from the emergence opening, without paying special attention to positioning of the low-strength region with respect to the crossbar portion of the tear seam. Thus, the airbag cover in accordance with the exemplary embodiments will facilitate the positioning of the skin layer with respect to the substrate.

What is claimed is:

1. An airbag cover that covers a folded airbag and is configured to provide an emergence opening which allows the airbag to deploy therefrom, the airbag cover comprising:

a substrate that includes:

a tear seam that is formed generally into an H-shape as viewed from above and is composed of a recess denting from a back surface toward a front surface of the substrate, the tear seam including a crossbar portion of the H-shape and two vertical-bar portions which extend in both directions from opposite ends of the crossbar portion; and double doors that are disposed on both sides of the crossbar portion and configured to open in opposite directions from the crossbar portion for forming the emergence opening when the tear seam tears; and a skin layer that is adhered to a front surface of the substrate and includes:

a breakable region that is formed into a generally straight line and configured to break to form the emergence opening, the breakable region including a central portion which extends along the crossbar portion of the tear seam in the substrate immediately above the crossbar portion, and two extended portions which extend from opposite ends of the central portion to outside of the vertical-bar portions; and an unadhered region in which the skin layer is not adhered to the substrate, the unadhered region being disposed at least in two band-shaped areas in the extended portions of the breakable region, wherein each of the band-shaped areas extends from each of the vertical-bar potions of the tear seam in the substrate in such a manner as to be extended from the crossbar portion; and wherein each of the band-shaped areas has a width smaller than a length of each of the vertical-bar portions.

2. The airbag cover of claim 1, wherein the unadhered region is disposed also in an area in the skin layer on the crossbar portion of the tear seam.

3. The airbag cover of claim 1, wherein:

the skin layer includes a fabric layer forming an outer surface of the skin layer and a cushion layer having a sheet shape and adhered to the fabric layer; and the fabric layer includes, in a back surface thereof, a low-strength region for promoting breakage of the breakable region.

4. The airbag cover of claim 3, wherein:

the low-strength region is formed to extend along the crossbar portion of the tear seam in the substrate; and a plurality of the low-strength regions are arranged generally in parallel to one another in a vicinity of the crossbar portion of the tear seam.

* * * * *